(12) United States Patent
Richards et al.

(10) Patent No.: US 11,587,052 B2
(45) Date of Patent: *Feb. 21, 2023

(54) CASINO CASH SYSTEM, APPARATUS AND METHOD UTILIZING INTEGRATED CIRCUIT CARDS

(71) Applicant: Everi Payments Inc., Austin, TX (US)

(72) Inventors: Timothy Richards, Las Vegas, NV (US); Dale Baltzell, Jenks, OK (US); Brian T. Sullivan, Las Vegas, NV (US)

(73) Assignee: Everi Payments, Inc., Las Vegas, NV (US)

( * ) Notice: Subject to any disclaimer, the term of this patent is extended or adjusted under 35 U.S.C. 154(b) by 74 days.

This patent is subject to a terminal disclaimer.

(21) Appl. No.: 17/149,251

(22) Filed: Jan. 14, 2021

(65) Prior Publication Data

US 2021/0133707 A1 May 6, 2021

Related U.S. Application Data

(63) Continuation of application No. 16/382,943, filed on Apr. 12, 2019, now Pat. No. 10,896,413, which is a
(Continued)

(51) Int. Cl.
*G06Q 20/00* (2012.01)
*G06Q 20/10* (2012.01)
(Continued)

(52) U.S. Cl.
CPC ......... *G06Q 20/105* (2013.01); *G06Q 20/227* (2013.01); *G06Q 20/341* (2013.01);
(Continued)

(58) Field of Classification Search
USPC ......... 705/41, 39, 38, 37, 26; 235/379, 380, 235/375; 726/2; 715/708; 707/793;
(Continued)

(56) References Cited

U.S. PATENT DOCUMENTS 3,959,028 A 5/1976 Jackson
4,660,168 A 4/1987 Grant et al.
(Continued)

OTHER PUBLICATIONS

Emerging ecommerce credit and debit card protocols; Proceedings. Third International Symposium on Electronic Commerce, (pp. 39-46); M.E. Peters; Jan. 1, 2002. (Year: 2002).*

(Continued)

*Primary Examiner* — Tien C Nguyen
(74) *Attorney, Agent, or Firm* — Weide & Miller, Ltd.

(57) ABSTRACT

Methods, systems and apparatus are provided for facilitating financial transactions using an IC type financial card via a terminal. A user is provided a list of transaction types, such as PIN-based, signature-based, etc., and a requested transaction is processed via a first selected transaction type. If the transaction is unsuccessful, the terminal automatically presents a list of remaining available transaction types from which the user may select and the transaction is processed by the next selected transaction type. If the transaction is successful, funds are provided to the user, such as in the form of currency/coins or funds transfer.

20 Claims, 7 Drawing Sheets

Related U.S. Application Data continuation of application No. 16/105,095, filed on Aug. 20, 2018, now Pat. No. 10,275,748, which is a continuation of application No. 15/047,198, filed on Feb. 18, 2016, now Pat. No. 10,068,210.

(60) Provisional application No. 62/233,089, filed on Sep. 25, 2015.

(51) Int. Cl.
| | |
|---|---|
| *G07F 19/00* | (2006.01) |
| *G06Q 20/22* | (2012.01) |
| *G06Q 20/34* | (2012.01) |
| *G06Q 20/38* | (2012.01) |
| *G06Q 20/40* | (2012.01) |

(52) U.S. Cl.
CPC ..... *G06Q 20/3825* (2013.01); *G06Q 20/4012* (2013.01); *G07F 19/203* (2013.01)

(58) Field of Classification Search
USPC .......................................... 358/1.14; 463/25
See application file for complete search history.

(56) References Cited

U.S. PATENT DOCUMENTS

| | | | | |
|---|---|---|---|---|
| 5,577,121 | A * | 11/1996 | Davis | H04L 9/3247 705/68 |
| 6,003,014 | A * | 12/1999 | Lee | G06Q 20/367 705/13 |
| 6,023,688 | A * | 2/2000 | Ramachandran | G06Q 20/1085 705/40 |
| 6,081,792 | A | 6/2000 | Cucinotta et al. | |
| 6,296,182 | B1 * | 10/2001 | Ota | G07F 7/04 235/492 |
| 6,554,185 | B1 * | 4/2003 | Montross | G07F 19/20 902/8 |
| 7,080,782 | B2 * | 7/2006 | Charrin | G06K 7/0004 235/492 |
| 7,152,783 | B2 * | 12/2006 | Charrin | G06Q 20/367 235/440 |
| 7,174,322 | B2 * | 2/2007 | Kosuda | G06Q 20/4012 705/72 |
| 7,188,761 | B2 * | 3/2007 | Ito | G06K 7/10336 235/379 |
| 7,600,673 | B2 | 10/2009 | Stoutenburg et al. | |
| 8,631,093 | B2 * | 1/2014 | Defosse | G07F 9/026 713/168 |
| 8,959,028 | B2 * | 2/2015 | Canter | H04L 67/02 705/16 |
| 9,195,930 | B2 * | 11/2015 | Bertin | G06K 19/07743 |
| 9,251,513 | B2 | 2/2016 | Nilsson et al. | |
| 9,384,477 | B2 | 7/2016 | Johnson et al. | |
| 10,496,968 | B2 | 12/2019 | Richards et al. | |
| 2002/0029190 | A1 | 3/2002 | Gutierrez-Sheris | |
| 2002/0052843 | A1 | 5/2002 | Canon | |
| 2003/0033251 | A1 | 2/2003 | Sherlock | |
| 2004/0230535 | A1 * | 11/2004 | Binder | G06Q 20/24 705/64 |
| 2005/0029340 | A1 * | 2/2005 | Ferraro | G07F 19/205 235/379 |
| 2006/0037835 | A1 | 2/2006 | Doran | |
| 2007/0125866 | A1 * | 6/2007 | Nishizawa | G06K 19/07739 235/492 |
| 2007/0168265 | A1 | 7/2007 | Rosenberger | |
| 2008/0010189 | A1 | 1/2008 | Rosenberger | |
| 2008/0091944 | A1 | 4/2008 | von Mueller | |
| 2008/0189214 | A1 | 8/2008 | Mueller | |
| 2008/0203172 | A1 | 8/2008 | Berardi et al. | |
| 2009/0159712 | A1 | 6/2009 | Mullen | |
| 2009/0288012 | A1 | 11/2009 | Hertel | |
| 2010/0223184 | A1 | 9/2010 | Perlman | |
| 2013/0218697 | A1 | 8/2013 | Kingston et al. | |
| 2013/0332349 | A1 * | 12/2013 | Dent | G06Q 20/18 705/40 |
| 2014/0081857 | A1 * | 3/2014 | Bonalle | G06Q 20/382 705/41 |
| 2014/0372300 | A1 * | 12/2014 | Blythe | G06Q 20/3676 705/41 |
| 2014/0372320 | A1 * | 12/2014 | Goldfarb | G07F 7/1033 705/72 |
| 2016/0020906 | A1 | 1/2016 | Nolte et al. | |
| 2017/0046685 | A1 | 2/2017 | Tatara | |
| 2020/0074469 | A1 | 3/2020 | Quigley | |

OTHER PUBLICATIONS

Real Time SMS-Based hashing scheme for securing financial transactions on ATM systems; 3rd IEEE International Conference on Adaptive Science and Technology (ICAST 2011) (pp. 1-6); Onwudebelu, U., Longe, O., Fasola, S., Obi, N.C.; Alaba, O.B; Nov. 24, 2011. (Year: 2011).*

EMV—Wikipedia, the free encyclopedia, "https://en.wikipedia.org/w/index.php?title=EMV&oldid=721927186", May 24, 2016, 20 pages.

International Search Report and Written Opinion for International Application No. PCT/US2016/053205 dated Dec. 9, 2016. 13 pages.

Office Action issued by the Canadian Intellectual Property Office for Application No. 3,025,541, dated Sep. 8, 2020, 6 pages.

Notice of Allowance issued by the Canadian Intellectual Property Office for Application No. 3,025,541, dated Jun. 8, 2021, 1 page.

Efficiently Achieving Full Three-Way Non-repudiation in Consumer-Level eCommerce and M-Commerce Transactions; 2011IEEE 10th International Conference on Trust, Security and Privacy in Computing and Communcations (pp. 664-672); Neville, S.W. Horie, M.; Nov. 16, 2011 . . . (Year: 2011).

* cited by examiner

CASINO CASH SYSTEM, APPARATUS AND METHOD UTILIZING INTEGRATED CIRCUIT CARDS

RELATED APPLICATION DATA

This application is a continuation of U.S. application Ser. No. 16/382,943, filed Apr. 12, 2019, which is a continuation of U.S. application Ser. No. 16/105,095, filed Aug. 20, 2018, now U.S. Pat. No. 10,275,748, which is a continuation of U.S. patent application Ser. No. 15/047,198, filed Feb. 18, 2016, now U.S. Pat. No. 10,068,210, and claims priority to U.S. Provisional Patent Application Ser. No. 62/233,089, filed Sep. 25, 2015. This application incorporates these prior applications by reference as if set forth herein in their entirety.

FIELD OF THE INVENTION

The present invention relates to monetary transaction processing devices and methods.

BACKGROUND OF THE INVENTION

Magnetic strip debit and credit cards have long been the technology of choice for debit and credit transactions. As the use of debit cards and credit cards have grown throughout the world, criminals have worked harder to steal them. Further compounding the problem has been large-scale data breaches and increasing rates of counterfeit card fraud. Nearly 40 percent of credit and debit card fraud involves stolen account numbers that are used to create counterfeit cards and 20 to 30 percent of fraud involves "card-not-present" fraud, wherein account numbers are used for transactions online or by phone.

If a thief obtains an account-holder's account number and the three- or four-digit security code printed on the chip card, the thief can use that account-holder's account information for transactions online or by phone. Or if the account-holder loses their credit or debit card that contains a chip, there's nothing that prevents a thief from using the account-holder's card in a store. Current estimates are 30 to 40 percent of fraud involved lost or stolen cards or claims of fraud that actually involve the account owner.

A new debit and credit card technology referred to as an integrated circuit card (referred to herein as an "IC" card") has been adopted by the industry to improve payment security and to make it more difficult for fraudsters to successfully counterfeit cards. Such cards include an integrated circuit on the card. One such card having a particular standard is managed by EMVCo, and thus these types of cards are commonly referred to as EMV cards. The Smart Card Alliance estimates that by the end of 2015 600 million account-holders will be using an IC card.

As the industry moves away from magnetic strip cards, retailers such as casinos are looking for new ways to offer more services using IC technology.

One key feature of an IC card relates to how the card chip creates a unique transaction code for each consumer action at a terminal (cash withdraw, cash advance, Point of Sale (POS)). A transaction cannot be used more than once. If a thief stole the chip information from one specific point of sale, card duplication would not work since the stolen transaction number created for a given transaction wouldn't be usable again and the transaction would just get denied.

However, the configuration of such integrated circuit cards is limiting to the user of the card, such as in successfully processing a request for funds.

SUMMARY OF THE INVENTION

One aspect of the invention is a system, apparatus and method for accessing funds from a financial account of an account-holder via a financial account card, and most preferably an IC card, via an account access and processing terminal, wherein the account-holder is automatically provided with additional options for accessing funds in the event an initial request is denied.

In one embodiment of a method of the invention, an account-holder accesses a terminal and requests a type of transaction and a transaction amount. The account-holder inserts or otherwise associates their financial card with the card reader of the terminal.

If the selected transaction type is a chip-and-PIN transaction (commonly known as a "debit" type transaction), the account-holder is prompted to provide his or her PIN. If the transaction is chip-and-signature transaction (commonly known as a "credit" type transaction), then an authentication may be performed, such as by receiving a signature and identification from the account-holder at the terminal or at a second location in the event the transaction is approved.

The transaction is processed. If the transaction is denied, the account-holder is automatically given an option to process the request via an alternate or second transaction type. The alternate transaction type may be selected from a list of transaction types (e.g. excluding unavailable or previously unsuccessful types). If a different or second transaction type is selected, a unique new transaction is created and routed to the processor. This sequence continues until all alternate transaction type choices have been made, the account-holder elects to discontinue, or until a transaction has been approved, all while the account-holder's card remains associated with the terminal and without prompting by the account-holder.

Upon successful processing of the transaction (whether via a first transaction type or subsequent transaction type), the account-holder may choose from the terminal how funds are to be delivered (such as via issuance of currency, coins, monetary value tickets, transfer to e-wallet or other accounts such as a casino account or the like) and a receipt may be issued. In the case of services or other non-money requests, a transaction is sent from the terminal to the casino or retailer POS system with the amount and authorization.

In an alternative embodiment of the invention, a query transaction is sent from the terminal to the processor and on to a bank to query the debit account amount available before a daily limit (or other cap/limit) is reached. A debit account daily amount available transaction is sent from the bank to the processor, then to the terminal. This amount is then checked against the amount requested. If the amount requested is more than the amount available, the terminal prompts the account-holder with an option to split the request into two or more transaction types, such as a PIN-based transaction for the amount available and signature-based transaction wherein a signature is required at a secondary location such as a casino cage for the additional amount.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Aspects of the invention comprise methods, systems and apparatuses for facilitating and/or processing financial transactions, such as to access funds from a financial account. The invention has particular utility to integrated circuit ("IC") card based transactions, e.g. a card or other media which is preferably associated with one or more financial accounts and which utilizes an associated integrated circuit as part of a financial transaction information read/write verification procedure, such as those cards which comply with the EMV card standard managed by EMVCo. It will be appreciated that such a card may be associated with one or more sources of funds. Such sources of funds may comprise, for example, a checking or savings account associated with a financial institution such as a bank or credit union. However, the card might be associated with or provide access to other sources of funds now or later developed, such as sources of credit, electronic wallets, investment accounts and so forth.

Figure 1A:
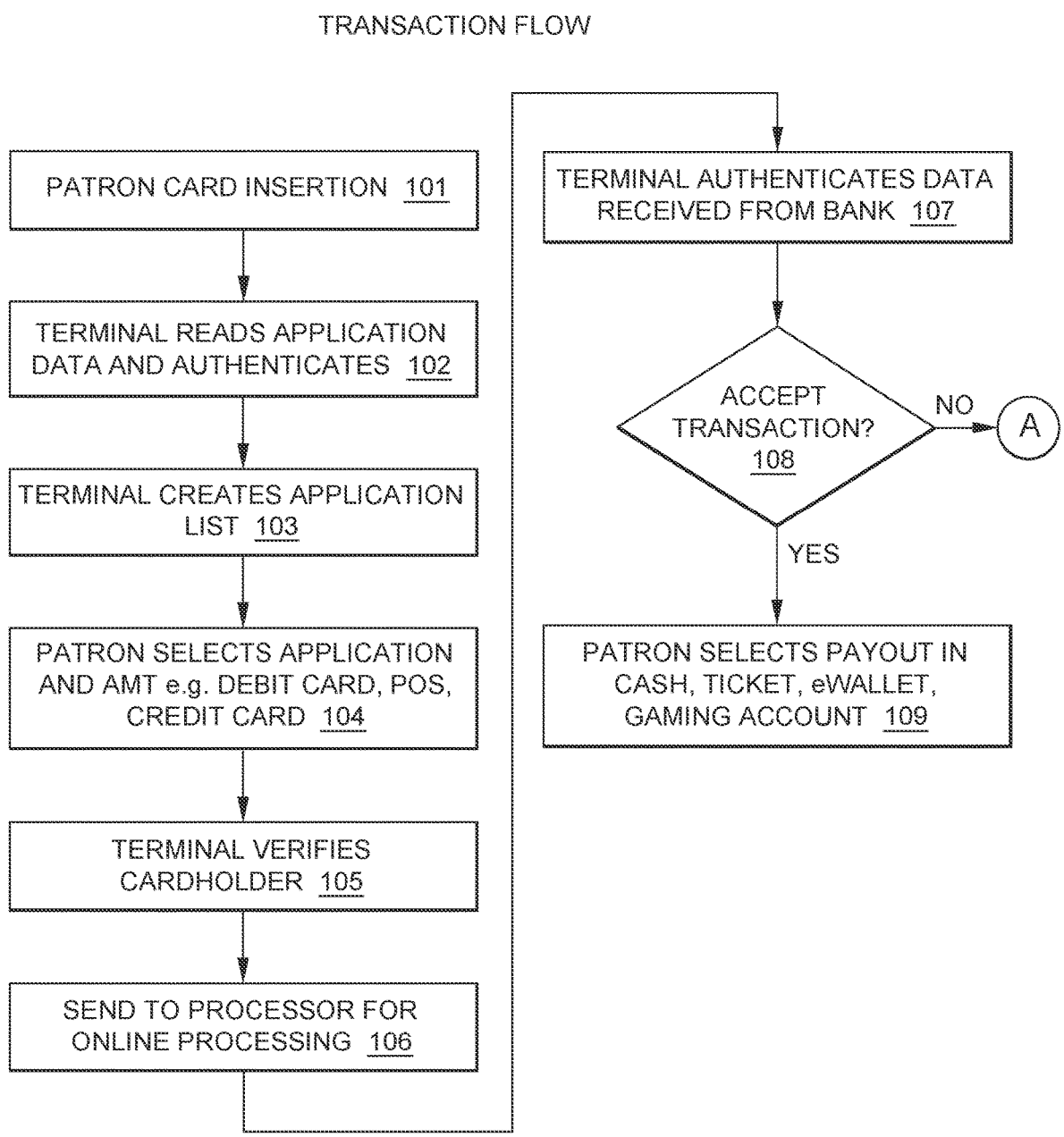
FIGS. 1A and 1B are flow diagrams illustrating a method in accordance with one embodiment of the invention.
Figure 1B:
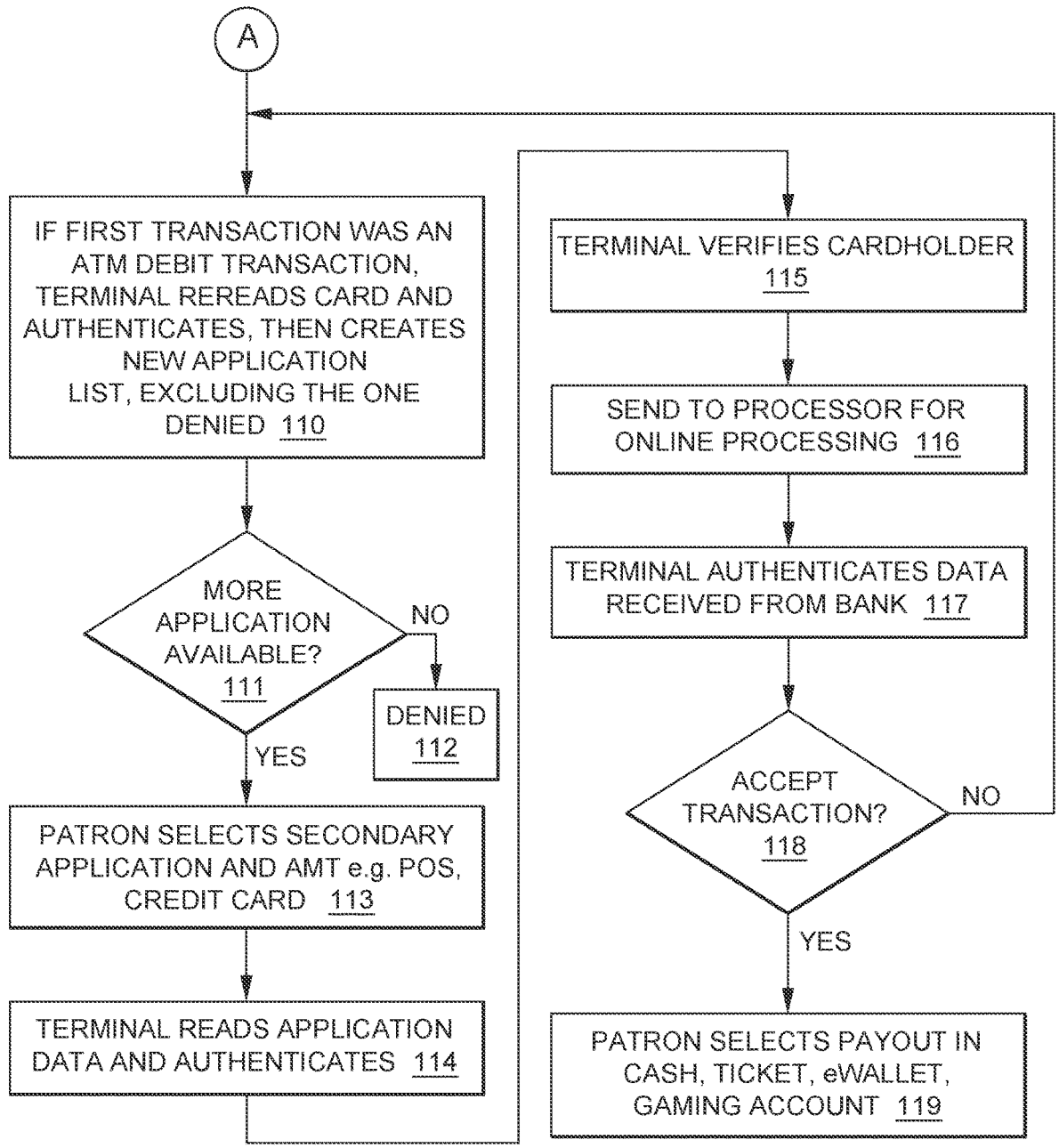
Figure 3:
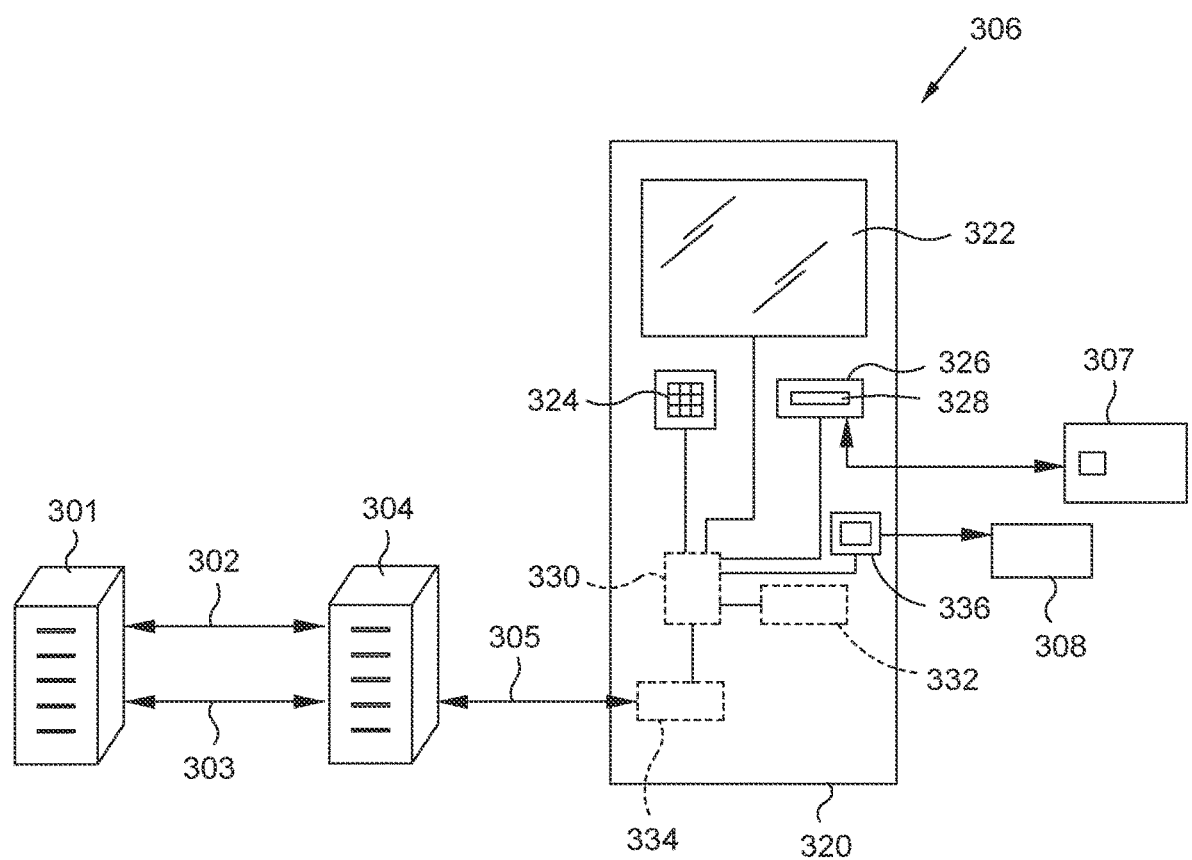
FIG. 3 illustrates a system in accordance with one embodiment of the invention.

FIGS. 1A and 1B are flow diagrams which illustrate one embodiment of a transaction flow of the present invention. FIG. 3 illustrates one embodiment of a system in accordance with the invention. A first embodiment of the invention will be described with reference to FIGS. 1A and 1B and FIG. 3.

In step 101, an account-holder presents an IC card 307 to a processing or transaction terminal 306 in order to receive or access funds. As described herein, the funds may be issued or provided to the account-holder in various forms, such as in the form of coins, currency or equivalent, casino ticket of value, electronic funds transfer such as to a vendor, an e-wallet, a casino account, or by other value instrument, including where the instrument can be used directly or indirectly as funds to purchase items of value such as casino game credits, merchandise, food, rooms, etc.

In one embodiment, such as illustrated in FIG. 3, the terminal 306 may comprise an automated teller machine ("ATM"), kiosk, point of sale (POS) device, or other device(s) which are configured to facilitate financial transactions. Such devices may have different sizes, shapes and configurations (including counter-top units, stand-up units, etc.). As one example, the terminal 306 may include a housing 320, one or more user interfaces and input devices, such as one or more electronic video displays 322, a keypad/buttons 324, touch screen, or the like. The terminal preferably also includes a media reader 326. In the case of an IC card, the reader 326 preferably comprises a card slot 328 which is configured to accept at least a portion of the card and which includes an associated chip reader, e.g. a device which is configured to engage/read information associated with the integrated circuit of the card (and preferably also write or transmit information to the integrated circuit). The terminal 306 may be configured with at least one dispenser 336 to dispense money or monetary value, such as coins and/or currency, other media such as tickets or the like. The terminal 306 preferably includes one or more processors 330, one or more memory or data storage devices 332 (such as for storing machine-executable code or "software"), and one or more communication interfaces 334 for transmitting and/or receiving data from other devices, such as to one or more financial processing networks, remote financial institutions or the like.

In one embodiment, the terminal 306 is configured, such as via hardware (e.g. a specially configured processor) and/or software (e.g. machine readable code which is stored the memory associated with the processor and which is executable by the processor), to perform the functionality indicated herein. For example, as described in more detail below, the software may be configured to cause the reader to read information from the card and present different transaction types to the user via a display of the terminal, receive a selected transaction type from the user, generate information regarding the selection (such as a request for processing of a requested monetary amount from an identified account), transmit the information to a financial processing network, accept information regarding the request (such as an approval or denial received back from the financial processing network), to dispense funds (if the transaction is approved), to re-read the card if the first transaction is denied to and to generate a new list of available transaction types (which list preferably does not include the first selected transaction type), to receive input of a second selected transaction type, etc., as detailed herein.

In one embodiment, the card 307 is inserted into a card reader slot of the terminal 306 (such as face-up into the slot, chip end first, or such other orientation as is required by the terminal/reader).

When terminal 306 detects that the card 307 has been presented, such as by being inserted into the terminal's card slot, the terminal reads the card. Preferably, the terminal 306 engages mechanical card components with the card to make physical contact with the card 307 to read the contents of the card via provided IC card interface functions, and to authenticate the card. As indicated herein, the authentication step may optionally prompt the account-holder for a pin, password, or other means of authentication or wait until step 104 to determine the required type of account-holder authentication for the account-holder selected transaction.

The card 307 preferably contains a list of Application Identifiers (AIDs) of every IC application that the card 307 is configured to support (directly or via information which can be used to determine such AIDs). In step 103, the terminal 306 generates or obtains a candidate list of applications that are supported by both the terminal 306 and the card 307 (the list might be generated in various ways, such as by direct interrogation, using a look-up table, remote validation, etc.).

Once a list of supported applications is built or obtained by terminal 306, the terminal is configured to cause an associated video display to display the list and information (such as text and/or graphics, such as in the form of a graphical user interface) to prompt the account-holder to select the desired type of transaction and the desired amount of the transaction.

In step 104, the account-holder provides input to the terminal 306, such as via touching the touchscreen or keypad of the terminal, to choose the desired application or transaction type. Possible transactions for a particular account-holder may be one or more of the following: a PIN-based transaction, a signature-based transaction, or other types of transactions now known or later developed.

When the account-holder selects a PIN-based transaction (which in conjunction with the use of an IC card may be referred to as a chip-and-PIN type transaction), the account-holder inputs such information, such by using the terminal's touchscreen or keypad to enter a sequence of numbers. If the transaction requires a signature (which may be referred to as a chip-and-signature or signature-based transaction), then as described below, the terminal 306 might be configured to collect the signature or perform other authentication or verification (such as by collecting identification information; such collection might be performed via interaction with a remote agent via the terminal or by direct implementation by the terminal), or this authentication might be performed remotely, such as by requiring the account-holder to physically go to a casino cage or to some other location where a signature (physical, digital or other type as meets the requirements for the transaction) can be collected by a cashier or other appropriate personnel (and which authentication may also require collection of secondary physical identification, such as from or via an identification card such as a state or federally issued identification card). Of course, the account-holder may not be required to perform the authentication steps unless the transaction is approved.

If there is only one application or transaction type supported by the card, such as a PIN-based transaction, that transaction is preferably automatically be selected without prompting the account-holder to select the application.

Once the application has been selected, the requested financial transaction is initiated in accordance with the selected transaction type. As described herein, this may entail use of different information and/or networks for attempting to process the financial transaction. In one embodiment, the terminal 306 provides the card 307 with data that it requests in a Processing Options Data Object List (PDOL). The PDOL is a list of data from the terminal 306 that is required by the card at the beginning of a Read Application Data (RAD) stage. The terminal 306 may use a Direct Object List (DOL), a list containing one or more pairs of tags and lengths but not values, and the associated processing rules, to format the requested data and to obtain transaction processing options. The terminal 306 then sends the data to the card 307 in a Get Processing Options (GPO) request prompting the card to supply the Application File Locator (AFL) to the terminal. The AFL is used by terminal 306 to read the application data records from the card 307 comprising tags of information used for transaction processing including cardholder verification and card authentication.

In step 105, cardholder verification checks that the person using the card 307 is the cardholder. The card 307 contains a list of verification methods that it supports, and the conditions under which they should be applied. The terminal 306 preferably automatically navigates through the list and attempts the first method it finds for which the condition is met. For example, a list might contain a list of two items: online PIN (if unattended cash) and signature (always). If a method fails, the terminal 306 checks if additional methods are allowed. Then the card and/or terminal analyzes the results of all previous steps and determines: 1) to seek online authorization of the transaction, or 2) to complete it offline at a secondary location after a signature is collected, or 3) to decline the transaction.

In step 106, the transaction or request for monetary value is preferably transmitted from the terminal to one or more remote systems or devices for processing. In one embodiment, the transaction request is sent from the terminal 306 via a communication link 305 to a remote processor 304. The remote processor 304 might be implemented by a computing device, such as a server, such as having one or more processors executing software, a communication interface and the like. The processor 304 determines the type of transaction and routes the transaction request to an appropriate financial processing network and/or device, which network and/or device might vary depending upon the transaction type. For example, the processor 304 might either route the transaction to a POS network 302 or to a financial processing network 303 (or other relevant network or system), then on to the card issuer bank 301 (or other financial institution, system or entity with which the account-holder's financial account is associated). In another embodiment, the terminal 306 may directly route the transaction or request to the financial processing network.

The bank 301 (such as via a computing device or computing system associated with the bank, either automatically and/or via user input) analyzes the transaction details and decides to authorize or reject the transaction request. For example, the bank 301 may check the account status and apply criteria based upon acceptable limits of risk defined by the bank 301, the payment scheme and the acquirer. If no valid response is received from the processor 304 due to communications failure, then the terminal 306 performs additional Terminal Action Analysis, the results of which will determine whether the transaction is accepted or declined.

Whether the transaction has been approved or denied by the bank 301, a response (such as an approval or denial) is sent back to terminal 306 (or if no response is received, such as a result of a communication time-out, then the terminal 306 may default to a "denial" status). In step 107, terminal 306 receives the transaction response and authenticates it.

If in step 108 the requested transaction has been accepted or approved, in step 109 the terminal 306 delivers or provides access to the requested funds (such as by issuing coins, currency, tickets and/or via electronic transfer, etc.). Alternatively, the terminal 306 may provide the account-holder with a list of options with regards to how funds are to be delivered. This may include, but is not limited to: cash, casino ticket, and/or funds transfer (such as to an e-wallet, a gaming or casino account, another account, a vendor account, etc.). Where a signature is required, additional authentication steps may be performed at the terminal 306 or remotely. For example, in one embodiment, the terminal 306 may prompt the account-holder to complete the transaction at a secondary location such as a casino cage where a signature may be collected, identification may be verified, etc. In another example, the authentication may be performed at the terminal 306, such as via a remotely interfaced agent or directly via the terminal (such as by input of a signature to the terminal, providing identification to the terminal—such as presenting/reading an identification card, etc.).

If the first transaction was denied, then in a step 110, if other applications or transaction types are available, a second application or transaction type is preferably automatically (e.g. without account-holder input or prompting) generated and presented (such as via a displayed menu or list of remaining transaction types). If more applications or transaction types remain available (e.g. are supported and were not previously selected and processed as above), then in step 111, the account-holder will be prompted in step 113 to choose the second application or transaction processing type to generate a second funds request transaction. If no additional applications are available, the request for funds is denied. For example, if the card 306 supports both PIN and signature based transaction types and the first selected transaction type was a PIN transaction, then the user may be presented with the option to perform a second transaction attempt using a signature based transaction type.

In step 114, the terminal 306 rereads the card 307 and re-authenticates, then creates new application list (e.g. creates a list of supported application or transaction types, excluding the initial failed/rejected transaction(s), such as an initial PIN-based transaction. In one embodiment, the available transaction types may be determined by interrogating the card for supported transaction types, though other means may be used to determine the available transaction types). The cardholder is authenticated (step 115) and the transaction is initiated via the second transaction type (such as using the appropriate protocol and network(s), such as by sending the second requested transaction to processor and on to bank (step 116). In step 117 the terminal 306 receives the response transaction. If the transaction was authorized, the terminal 306 either delivers funds to the account-holder or prompts the account-holder with a list of options regarding how funds may be delivered. This may again include dispensing of cash or a casino ticket, funds transfer to an e-wallet, funds transfer to a gaming account, etc. Where a signature is required, the terminal 306 prompts the account-holder to complete the transaction, such as at the terminal or remotely at a secondary location as described above.

If the transaction is denied, the terminal 306 builds a new application or transaction type list with those applications/transaction types that are supported and were not previously denied, and the process returns to step 110. This continues until either the transaction has been accepted, the account-holder elects to discontinue the transaction, or until there are no more applications for the account-holder to use to access funds, wherein the account-holder is denied.

Once the desired transaction is completed, no further transaction types are available or are selected by the user, then the card 307 may be removed from the terminal 306. In this regard, it will be appreciated that a card "session" may be referred to as the period between when the card 307 is inserted and when it is removed. During a single session, as described herein, multiple transactions may be performed or may be attempted while the card remains engaged with the reader (as indicated herein, one important aspect of the invention is that the terminal is configured to present and process multiple transaction types without the user having to remove and re-insert their card between an attempted first transaction type and a second (or subsequent) attempted transaction type). In one embodiment, the user may be prompted to remove their card, such as via a prompt which is displayed on a display of the terminal: a) after successful completion of a financial transaction via the first transaction type; b) after the user declines to attempt a second (or subsequent) transaction type when the processing via the first transaction type was unsuccessful; and c) after successful completion of the financial transaction via a second (or subsequent) transaction type. A user might also be prompted to maintain the card in its inserted position after a financial transaction is unsuccessful via a first transaction type to ensure that the terminal can re-read the card and prepare the new list. Aside from information displayed on a display, such prompts might include lights (such as a RED light to indicate the card should not be removed and a GREEN light when the user should remove the card).

Figure 4A:
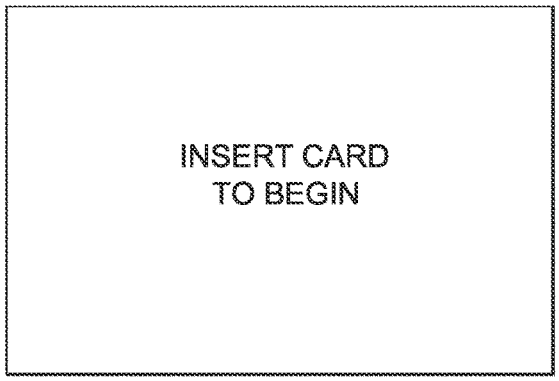
FIGS. 4A-4I are screen shots in accordance with one embodiment of the invention.

One example of the present invention will be described with reference to FIGS. 4A-4I. These figures illustrate exemplary screen shots, such as which might be displayed by a screen 322 of a terminal 306 such as that illustrated in FIG. 3. As illustrated in FIG. 4A, a user might be instructed to insert their card 307 into a card reader of the kiosk or terminal 306 to begin a transaction. In the preferred embodiment, once the user inserts their card, they may be instructed to leave the card inserted for the duration of the transaction in order to facilitate the method of the invention.

Figure 4B:
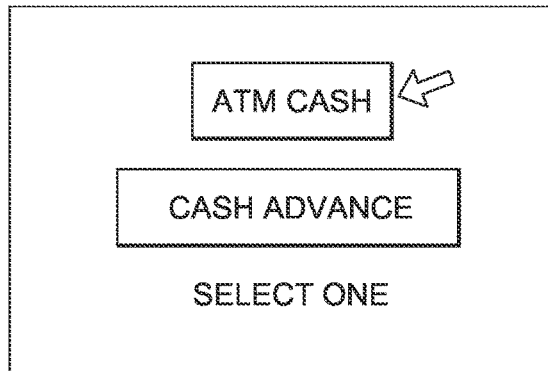
Figure 4C:
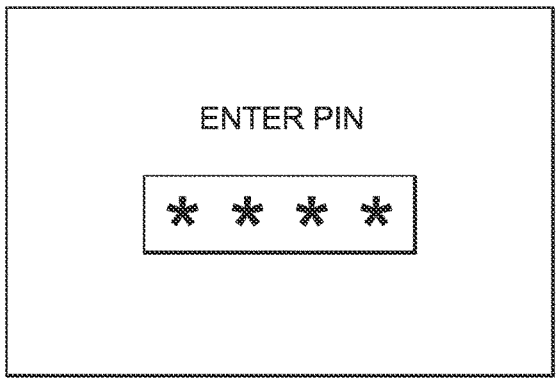
Figure 4D:
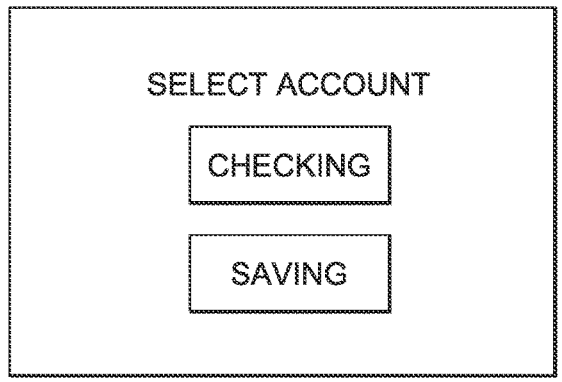

As illustrated in FIG. 4B, once a user has inserted their card 307, they may be presented with different options for accessing funds, such as via an ATM (chip and PIN) type transaction or a Cash Advance (chip and signature) type transaction (wherein the offered transactions types may be determined by an interrogation of the user's card for the different types of supported transactions). One or more of the available transaction options may be displayed to the user. In this example, the user has selected "ATM Cash." In response, as illustrated in FIG. 4C, the user may be instructed to enter their PIN, such as via a keypad of the terminal 306. Upon entry of the correct PIN for their account, the user may be presented with the option of selecting a desired account from which to access funds (such as if multiple accounts are associated with the user's card 307). For example, as illustrated in FIG. 4D, a user might be presented with the option to access funds from their checking or savings account.

Figure 4E:
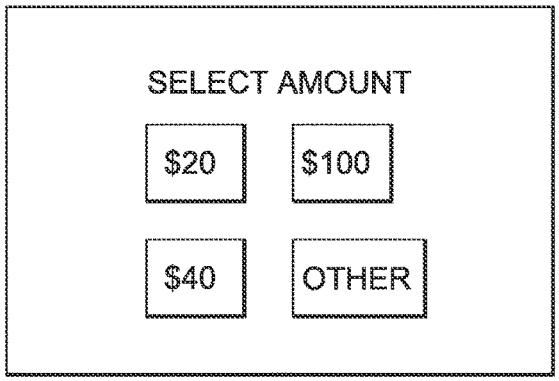

As illustrated in FIG. 4E, upon selecting a desired account, the user may be provided with the option of selecting a desired transaction amount. This information might be presented in various manners, such as by presenting the user with the option to select a particular pre-designated amount (such as $20, $40, etc.) or by inputting a desired amount.

Figure 4F:
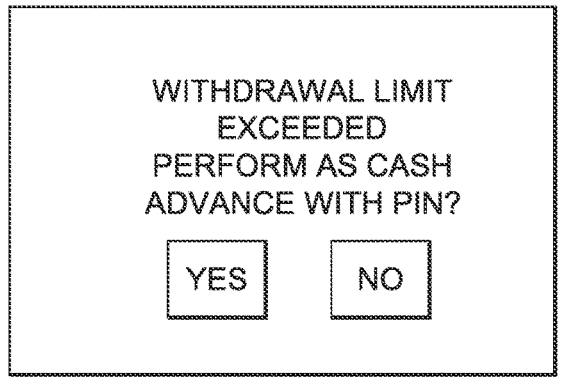
Figure 4G:
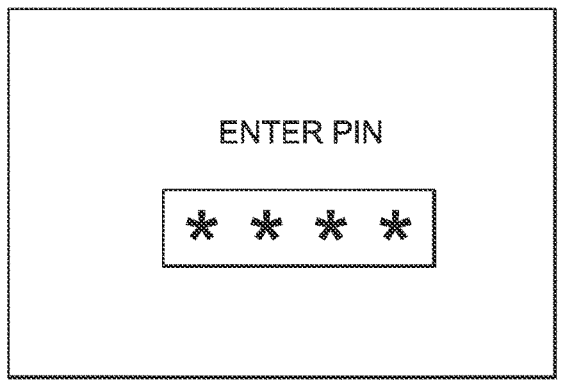

In this example, the user has selected or input a desired amount, but the desired amount has been determined to exceed the withdrawal limit for the account (such as based upon a maximum daily withdrawal limit). Most importantly, as illustrated in FIG. 4F, the user has been so notified and has automatically been presented with the option of seeking funds via a different transaction type. In accordance with the present invention, as described above, the user's card preferably remains inserted or engaged during this process. The user's card may have been interrogated to determine that the card also supports funds access via a cash advance type transaction (either initially or after rejection of the first transaction). As a result, this type of transaction has been offered to the user as an alternative means of accessing funds.

Figure 4H:
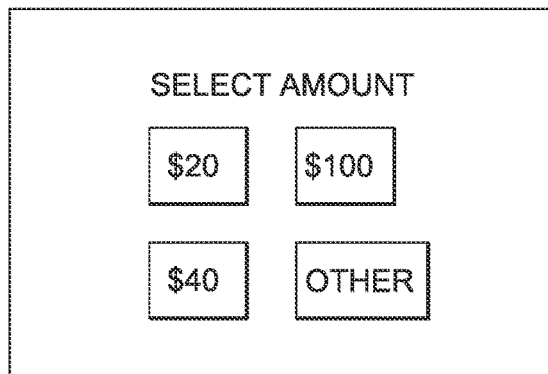
Figure 4I:
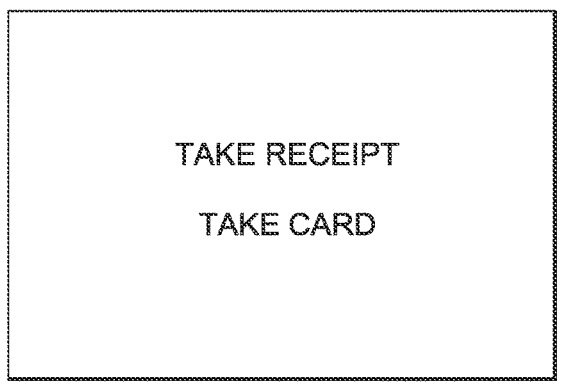

In this example, the user has selected the option of accessing funds via a cash advance and has, as illustrated in FIG. 4G, again been asked to provide their PIN. As illustrated in FIG. 4H, once the PIN has been input and verified, the user may again be presented with the option of selecting a desired transaction amount. In this example, the user has selected or input a desired amount and the amount has been approved. In one embodiment, a receipt has been issued by the terminal 306 representing the transaction. As illustrated in FIG. 4I, the user may be instructed to now remove their card 307 (e.g. the user only now removes their card after the completion of the transaction after the initial transaction was rejected, the secondary transaction was offered and completed) and to take their receipt. The receipt may provide evidence of the transaction and may instruct the user to go to a cashier or other location to obtain their funds. When the user goes to the cashier, they may provide their receipt to the cashier and may be provided the requested funds, such as upon secondary authentication (such as by providing a signature).

Of course FIGS. 4A-4I are just one example of screen shots of information which may be presented to a user of a terminal based upon a transaction which is implemented in accordance with the present invention. Other information might be displayed to the user or the information might be displayed in other manners. Further, different information would be displayed based upon other types of available transactions, user inputs/selections and the like.

Dual Transaction Alternative Embodiment

In an alternative embodiment, after a card 307 is inserted and queried/authenticated, a query transaction is sent from the terminal 306 to the bank 301 (or other financial institution), such as via processor 304, to retrieve a debit account daily limit amount which is available from the account(s) which is associated with the account-holder presented card 307.

Figure 2A:
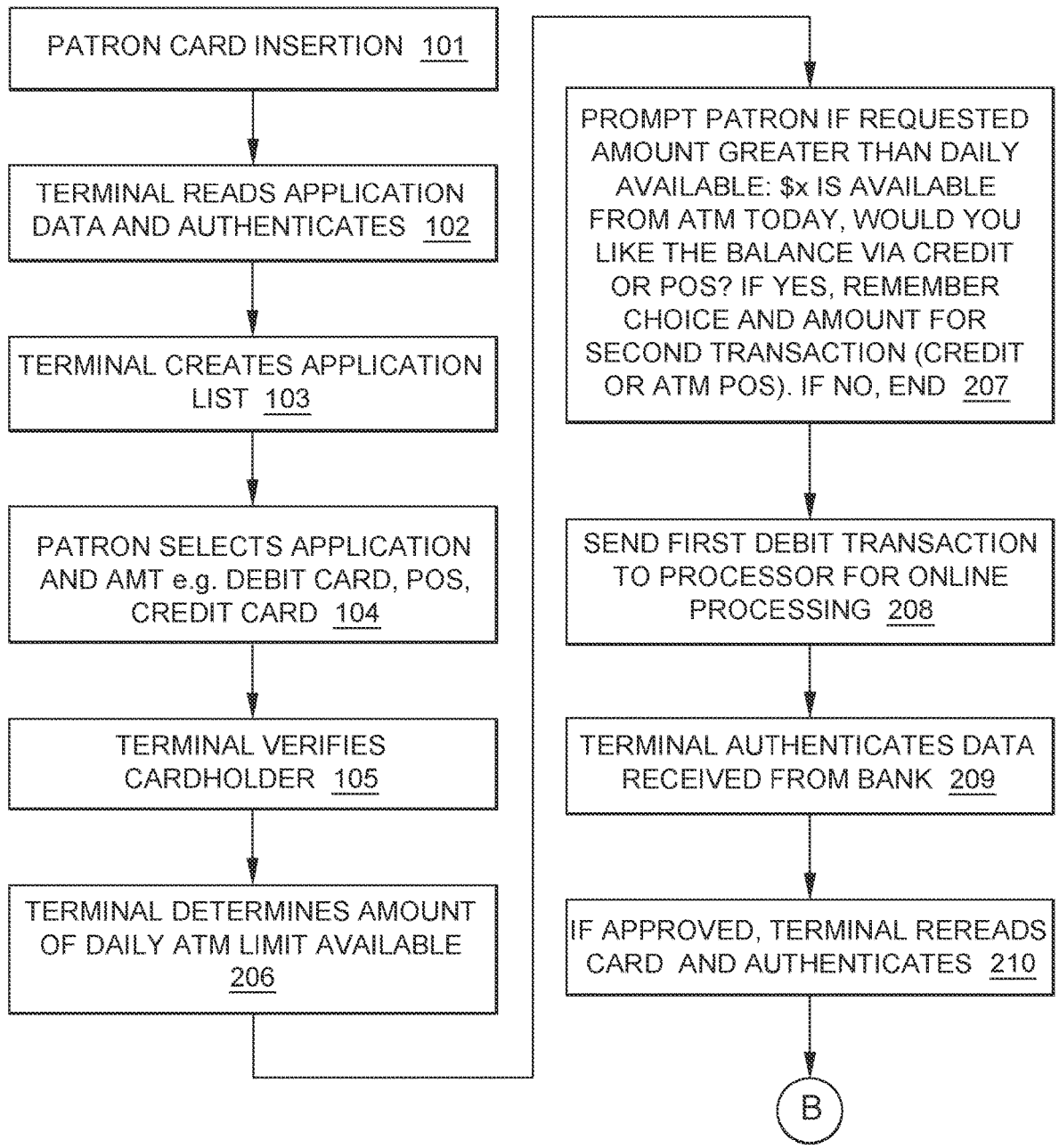
FIGS. 2A and 2B are flow diagrams illustrating a method in accordance with another embodiment of the invention.
Figure 2B:
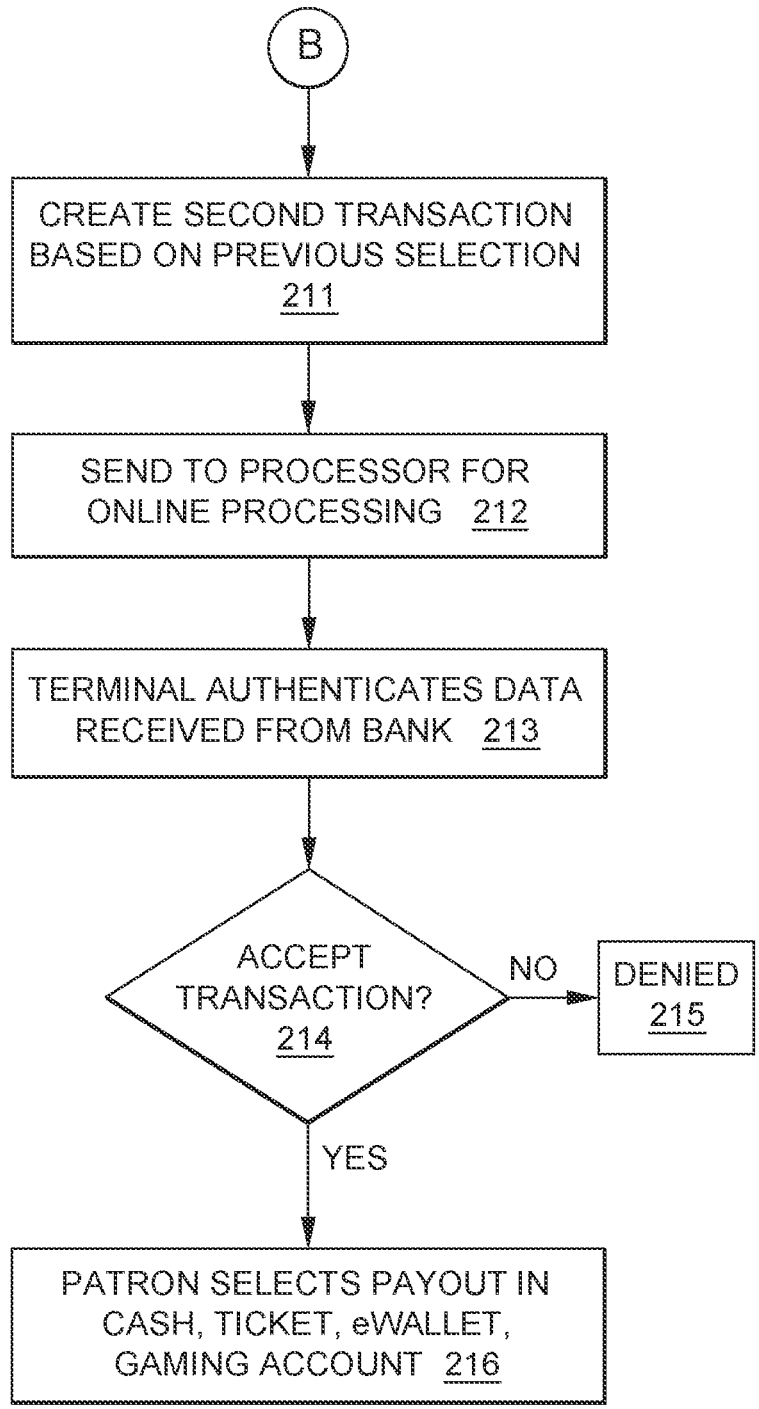

One embodiment of this process will be described with reference to FIGS. 2A and 2B. Step 100 through step 105 are as previously described.

In step 206 a debit account daily amount available transaction query is sent from the terminal 306 to the bank 301, such as after a user requests a desired transaction amount. The bank 301 then responds to the processor 304 and the processor responds back to the terminal 306 to provide the debit daily limit amount that is available. In step 207, the daily limit or other accessible amount is checked against the amount requested by the account-holder. If the amount requested is more than the amount available, the terminal 306 prompts the account-holder with an option to split the request into two or more different transactions based upon different transaction types. As one example, the transaction might be split into: 1) a PIN-based transaction for the amount available and a 2) signature-based transaction wherein a signature is required (such as via the terminal or at a secondary location such as a casino cage) for the additional or remaining amount which was requested.

In step 208, the first transaction (such as the PIN-based transaction) is sent from the terminal 306 to the processor 304 for online processing.

In step 209, the bank 301 returns a response to the terminal 306 via the processor. If the PIN-based transaction is approved, the terminal 306 logs the amount approved, then in step 210, the terminal 306 rereads the card 307 and authenticates. In step 211, the terminal 306 prepares a second transaction.

The second transaction is sent to the processor 304 for online processing in step 212. A response is then received and authenticated by the terminal 306 in step 213 and a decision is made in step 214. If the second transaction is denied, the account-holder is notified that amount requested exceeds the daily debit amount limit and the secondary POS transaction has been denied. The terminal 306 then dispenses the amount available from the transaction.

If the second transaction is approved, step 216 the terminal 306 prompts the account-holder with a list of option regarding how funds may be delivered. This may include cash, a casino ticket, funds transfer to e-wallet, funds transfer to a gaming account, etc.

While aspects of the invention have been described with reference to the perspective of the account-holder or system operator, it will be appreciated that the invention corresponds to both entities. For example, while the invention includes the step of an account-holder presenting a card at a terminal, the invention correspondingly includes the step of the terminal operator "receiving" the card via presentation of the card at the terminal.

While certain transaction types and associated financial processing systems have been described herein, it will be appreciated that the transactions might be referred to by other terminology (for example, an "ATM" transaction is often used to referred to as a PIN-based transaction due to the fact that automated teller machines are frequently used to process PIN-based transactions; other transactions are often referred to as POS, debit, or credit transactions or the like and the invention may apply to any such transaction). Further, the invention may apply to other types of applications or transaction types now known or later developed. Further, while the invention has particular utility to an IC card, aspects of the invention may be applied to other cards or media having similar characteristics.

As indicated herein, in one embodiment of the invention, AIDs are determined from the card and the player may be presented with a menu of different available transaction types and may select from those transaction types (either in the initial processing of a request for funds or in a subsequent attempt). In another embodiment, the AIDs might be determined and then the terminal or system might automatically select or present the transaction processing type. For example, upon determining that the card supports both chip-and-pin and chip-and-signature type transactions, the terminal might automatically initially select the chip-and-pin transaction (wherein if the requested transaction cannot be processed via that type of transaction, the terminal might then present the chip-and-signature as an alternative).

In yet another embodiment of the method, the AIDs may not even been read or used. Instead, the terminal and/or system might be configured to automatically present and/or try particular transaction types (such as common transaction types or certain ones which the terminal is programmed to implement), without regard to a determination of whether the card supports that type of transaction. In that event, the method may be streamlined by automatically processing a requested transaction using a first transaction type (e.g. without the steps of determining available transaction types, presenting available transaction type options to the user and receiving a selection thereof), a second transaction type, etc., even though in a few cases a transaction might be rejected because the selected transaction is not of the type supported by the card.

In an alternative embodiment, a particular IC card issued by a bank, credit union, casino or a corporation such as Everi Holdings, Inc., may further support a plurality of applications and transactions from more than one financial account located at different financial institutions, banks or credit unions whereby the identified options may include selection of a designated account and transaction type.

It will be appreciated that the steps of the methods described herein may be performed in other orders (for example, user authentication (such as the receiving of a user's signature) might be performed before a transaction is processed or after it is approved. Further, methods of the invention might comprise other or additional steps.

The invention has numerous advantages. A particular advantage of the invention is the processing of a financial transaction using an IC card where multiple transaction attempts may be performed to complete the transaction without requiring the account-holder to remove and re-insert the card or re-initiate a completely new transaction. In particular, in accordance with the invention, a unique methodology is employed which allows a terminal to attempt to process a sequence of different financial transaction types in order to fulfill an account-holder's request to access funds, even in the face of the unique security configuration of an IC card. Importantly, the terminal is configured to automatically present and prompt an account-holder with additional options for fulfilling a financial transaction request even when an initial transaction failed.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of facilitating a request to access monetary value associated with a financial account comprising the steps of:
    receiving an integrated circuit financial card in a card reader at a transaction terminal, said integrated circuit financial card comprising a card media having an associated integrated circuit having information associated therewith;
    controlling said card reader to cause at least one integrated circuit engaging component thereof to move from a first unengaged position in which said integrated circuit engaging component is not in contact with said integrated circuit of said integrated circuit financial card to a second engaged position in which said integrated circuit engaging component contacts said integrated circuit of said integrated circuit financial card;
    reading said information from said card by said card reader;
    displaying a list of transaction types to a user of said terminal;
    receiving input of a first transaction type from said list of transaction types and said monetary value from a user of said card;
    processing said request via said first transaction type;
    when said transaction is approved, providing said requested monetary value to said user; and
    when said transaction is denied, without input from said user of said card, controlling said card reader to cause said at least one integrated circuit engaging component of said card reader to remain in said second engaged position to continue to engage said integrated circuit of said integrated circuit financial card, automatically re-reading said card and processing said request via a second transaction type which is different than said first type.

2. The method in accordance with claim 1 wherein said displayed list of transaction types comprises two or more transaction types determined based upon said information read from said card.

3. The method in accordance with claim 1 wherein said transaction terminal comprises at least one of a kiosk, ATM and POS terminal.

4. The method in accordance with claim 1 wherein said step of processing said request via said first transaction type comprises transmitting said request to a first financial processing network and said step of processing said request via said second transaction type comprises transmitting said request to a second financial processing network.

5. The method in accordance with claim 4 wherein said card is associated with a financial institution account belonging to said user and said first and second financial processing networks are linked to said financial institution of said financial institution account.

6. The method in accordance with claim 1 wherein said available transaction types comprise at least one of a PIN based transaction type and a signature based transaction type.

7. The method in accordance with claim 1 wherein said first transaction type comprises a PIN based transaction type, said method further comprising the step of receiving input from said user of a PIN at said transaction terminal.

8. The method in accordance with claim 7 wherein processing of said request based upon said first transaction type is denied, processing said request via a second transaction type which comprises a signature based transaction type.

9. The method in accordance with claim 1, wherein when said transaction is denied, displaying said list of transaction types from said user and receiving input from said user of said second transaction type.

10. A transaction terminal configured to process a requested financial transaction, comprising:
    a housing;
    a card reader, said card reader configured to accept at least a portion of an integrated circuit card and configured to engage at least one integrated circuit engaging component with an integrated circuit of said integrated circuit card by moving said at least one integrated circuit engaging component from a first unengaged position in which said integrated circuit engaging component is not in contact with said integrated circuit of said integrated circuit financial card to a second engaged position in which said integrated circuit engaging component contacts said integrated circuit of said integrated circuit financial card to read information therefrom;
    a monetary dispensing device;
    at least one user input device;
    at least one electronic video display;
    a communication interface configured to transmit information to and receive information from at least one financial processing network;
    at least one processor configured to execute machine readable code;
    at least one memory configured to store said machine readable code; and
    said machine readable code configured to be executable by said at least one processor to cause said processor to:
        cause said card reader to control said at least one integrated circuit engaging component to move from said first unengaged position to said second engaged position to engage with said integrated circuit and to read information associated with said integrated circuit of said card;
        cause said at least one electronic video display to display a list of transaction types;
        receive, relative to said request, via said at least one user input device a desired first transaction type selected from said list and amount of said monetary value from a user of said card;
        process said request via said first transaction type;
        when said transaction is approved, cause said monetary dispensing device to dispense said requested monetary value to said user; and
        when said transaction is denied, without input from said user of said card, control said at least one integrated circuit engaging component to remain in said second engaged position to continue to engage said integrated circuit of said card, cause said reader to re-read said card, process said request via a second transaction type.

11. The transaction terminal in accordance with claim 10 wherein said first transaction type comprises one of a signature based transaction type and a PIN based transaction type.

12. The transaction terminal in accordance with claim 10 wherein said processing said request via said first transaction type comprises generating a first request for approval of said requested financial transaction and transmitting said first request via said communication interface to a first financial processing network.

13. The transaction terminal in accordance with claim 10 wherein said card is associated with a financial account of a financial institution.

14. The transaction terminal in accordance with claim 10 wherein if said first or second transaction type comprises a PIN based transaction type, said machine-readable code further configured to cause said at least one processor to accept a PIN from said user via said at least one user input device of said terminal.

15. The transaction terminal in accordance with claim 10 wherein said machine-readable code is configured to cause said processor to, when said transaction is denied, cause said video display said list of transaction types and receive, via said at least one user input device of a second transaction type selected from said list.

16. The transaction terminal in accordance with claim 10 wherein said at least one processor is configured to generate said list of transaction types from information comprising application identifiers read from said card by said card reader.

17. A transaction terminal configured to process a requested financial transaction by an account holder, comprising:
   a housing;
   a card reader, said card reader configured to accept at least a portion of an integrated circuit card and configured to engage at least one integrated circuit engaging component with an integrated circuit of said integrated circuit card to read information therefrom by moving said at least on integrated circuit engaging component from a first unengaged position in which said integrated circuit engaging component is not in contact with said integrated circuit of said integrated circuit financial card to a second engaged position in which said integrated circuit engaging component contacts said integrated circuit of said integrated circuit financial card from a first unengaged position to a second engaged position to make physical contact with the integrated circuit card;
   a monetary dispensing device;
   at least one user input device;
   at least one electronic video display;
   a communication interface configured to transmit information to and receive information from at least one financial processing network;
   at least one processor configured to execute machine readable code;
   at least one memory configured to store said machine readable code; and
   said machine readable code configured to be executable by said at least one processor to cause said processor to:
      cause said card reader to control said at least one integrated circuit engaging component to move from said first unengaged position to said second engaged position to engage said integrated circuit of said card and read information associated with said card;
      display a list of financial processing transaction types for processing a requested financial transaction by said account holder;
      process said request via a first transaction type from said list;
      when said transaction is approved, cause said monetary dispensing device dispense said requested monetary value to said account holder; and
      when said transaction is denied, without input from said user of said card, control said at least one integrated circuit engaging component to remain in said second engaged position to continue to engage said integrated circuit of said card, and cause said card reader to re-read said card and process said request via said second transaction type which is different than said first transaction type.

18. The transaction terminal in accordance with claim 17 wherein said processor processes said request via said first and second transaction types by communicating with an external banking system for an approval of said requested transaction.

19. The transaction terminal in accordance with claim 17 wherein said step of reading comprises reading application identifiers stored by said integrated circuit of said card.

20. The transaction terminal in accordance with claim 19 wherein said step of display said list of financial processing types comprises comparing financial processing types supported by said terminal to those associated with said card as identified by said step of reading said application identifiers.

* * * * *